UNITED STATES PATENT OFFICE.

CARL HOFFMANN, OF HÖCHST-ON-THE-MAIN, GERMANY, ASSIGNOR TO THE FARBWERKE, VORMALS MEISTER, LUCIUS & BRÜNING, OF SAME PLACE.

RED RHODAMIN DYE AND PROCESS OF MAKING SAME.

SPECIFICATION forming part of Letters Patent No. 613,926, dated November 8, 1898.

Application filed December 29, 1897. Serial No. 664,451. (Specimens.)

*To all whom it may concern:*

Be it known that I, CARL HOFFMANN, doctor of philosophy, a citizen of the empire of Austria-Hungary, residing at Höchst-on-the-Main, Germany, have invented certain new and useful Improvements in the Manufacture of Rhodamindialkylamids, (for which I have obtained Letters Patent in Germany, No. 94,237, dated November 12, 1896, and No. 94,584, dated January 14, 1897; in England, No. 1,592, dated January 20, 1897, and in France, No. 263,318, dated January 21, 1897,) of which the following is a specification.

This invention relates to the production of rhodamindialkylamids.

I have discovered that by the successive reaction of rhodamins with oxychlorid of phosphorus and dialkylamins valuable dyestuffs are obtained. The method may be applied to tetra as well as to tri and di alkylrhodamins, and as dialkylamins are, for instance, employed diethyl, dimethyl, and diamyl amins.

The process is as follows: One part, by weight, of diethylrhodamin hydrochlorid is mixed with three parts, by weight, of oxychlorid of phosphorus. The reaction thus produced is finished by heating to 80° centigrade. The cooled brown-red mass is then treated with benzene to remove the excess of oxychlorid. An insoluble brownish-red oil remains behind. This is mixed with diethylamin in absence or, better, in presence of an indifferent solvent, as chloroform, and taking care to prevent a violent reaction by cooling. The mixture is heated for some time at about 50° centigrade. The chloroform and excess of the base is distilled off, the residue extracted with hot water, and from the filtered solution the new dyestuff is precipitated as double salt of chlorid of zinc. It is soluble in water with a yellowish-red color and fluorescence. Alkali carbonates dissolve it unchanged. Free alkalies decompose it into rhodamin and dialkylamin.

Having now described my invention, what I claim is—

1. The process for the manufacture of rhodamindialkylamids which are red dyestuffs, consisting in treating rhodamins with oxychlorid of phosphorus and then with dialkylamins, substantially as set forth.

2. As a new product, the dyestuff obtained by the consecutive action of oxychlorid of phosphorus and dialkylamins upon symmetric dialkylrhodamins, the same being in the form of its double salt of chlorid of zinc a substance of metallic luster, soluble in water and alcohol, insoluble in benzene, the aqueous solution being yellowish-red and fluorescent, the dyestuff dissolving unchanged in alkali carbonates, while free alkalies decompose it into rhodamin and dialkylamin, substantially as set forth.

In testimony that I claim the foregoing as my invention I have signed my name in presence of two subscribing witnesses.

CARL HOFFMANN.

Witnesses:
   HEINRICH HAHN,
   ALFRED BRISBOIS.